Aug. 8, 1967 R. C. RUSSELL 3,334,709
AUTOMATIC BRAKE ADJUSTER
Filed Jan. 6, 1965 2 Sheets-Sheet 2
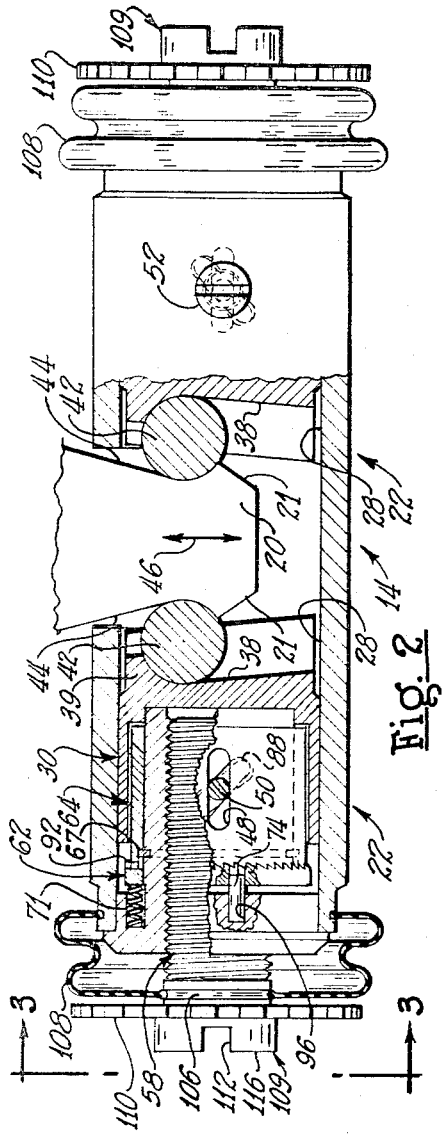
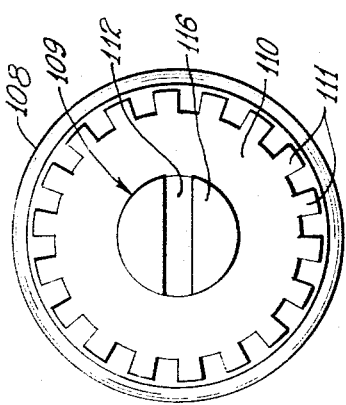
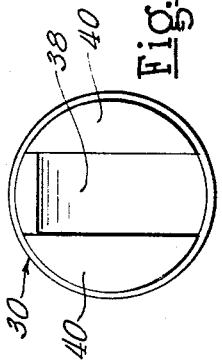
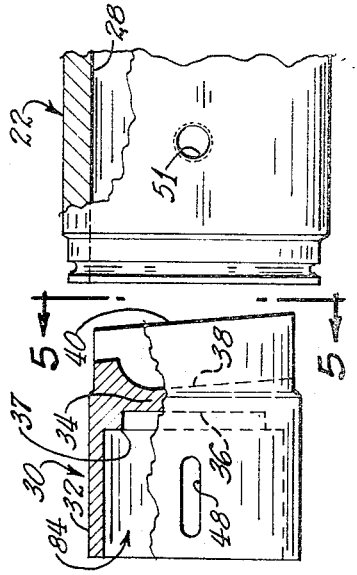
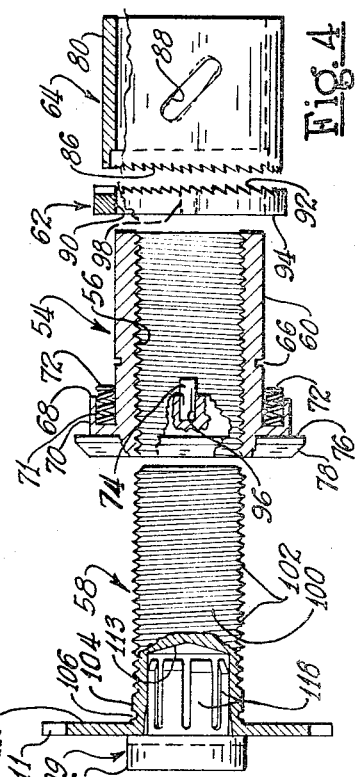
INVENTOR.
ROBERT C. RUSSELL
BY
Schramm, Kramer & Sturges

United States Patent Office 3,334,709
Patented Aug. 8, 1967

3,334,709
AUTOMATIC BRAKE ADJUSTER
Robert C. Russell, Asheville, N.C., assignor to Eaton Yale & Towne Inc., a corporation of Ohio
Filed Jan. 6, 1965, Ser. No. 423,809
13 Claims. (Cl. 188—79.5)

This invention relates to a mechanism for automatically adjusting brakes of the friction-shoe type; and more particularly the invention relates to a mechanism for adjusting brakes on automotive vehicles, with the adjustment being effected automatically during actuation of the brakes.

The problem

Heretofore, many attempts have been made to develop a truly fool-proof, automatic brake adjustment mechanism for application to automotive vehicles at a competitive price. A main problem, of course, which has plagued the industry is the complexity of the prior mechanisms, leading first to unduly high cost and thus limiting application to more expensive vehicles or causing such to be optional equipment. Further, the complexities of the prior mechanisms have led to high maintenance costs, which offset the convenience provided by such mechanisms, actually resulting in higher overall costs than routine hand adjustment of non-automatic mechanisms.

Accordingly, an important contribution would be provided to the art by an improved, self-compensating brake adjusting mechanism of simple construction, high durability, and economy of manufacture.

It is therefore an important object to provide an improved, automatic brake adjusting mechanism.

It is a further object of the present invention to provide an improved automatic brake adjusting mechanism wherein all parts are enclosed within a sealed chamber, to prevent loss of lubricant and entrance of foreign materials.

A further object is to provide an automatic brake adjusting mechanism that is effective regardless of expansion and contraction of brake drums, as of heavy vehicles, due to substantial temperature changes caused by extended and heavy brake applications.

Another object is to provide an improved automatic brake adjusting mechanism for wedge-type brakes used on heavy road vehicles such as trucks.

A still further object is to provide a novel automatic brake adjusting mechanism that is compact and of simplified construction, yet rugged and dependable.

Other objects of the invention will appear in the following description and appended claims, reference being had to the accompanying drawings forming a part of the specification wherein like reference characters designate corresponding parts in the several views.

FIGURE 2 is a plan view, partly in section, of the mechanism of FIGURE 1, taken along line 2—2 of FIGURE 1;

FIGURE 3 is an end elevational view taken along line 3—3 of FIGURE 2;

FIGURE 4 is an exploded elevational view, with parts in section, showing the components making up the automatic mechanism of invention; and FIGURE 5 is an elevational view taken along line 5—5 of FIGURE 4.

Figure 1:
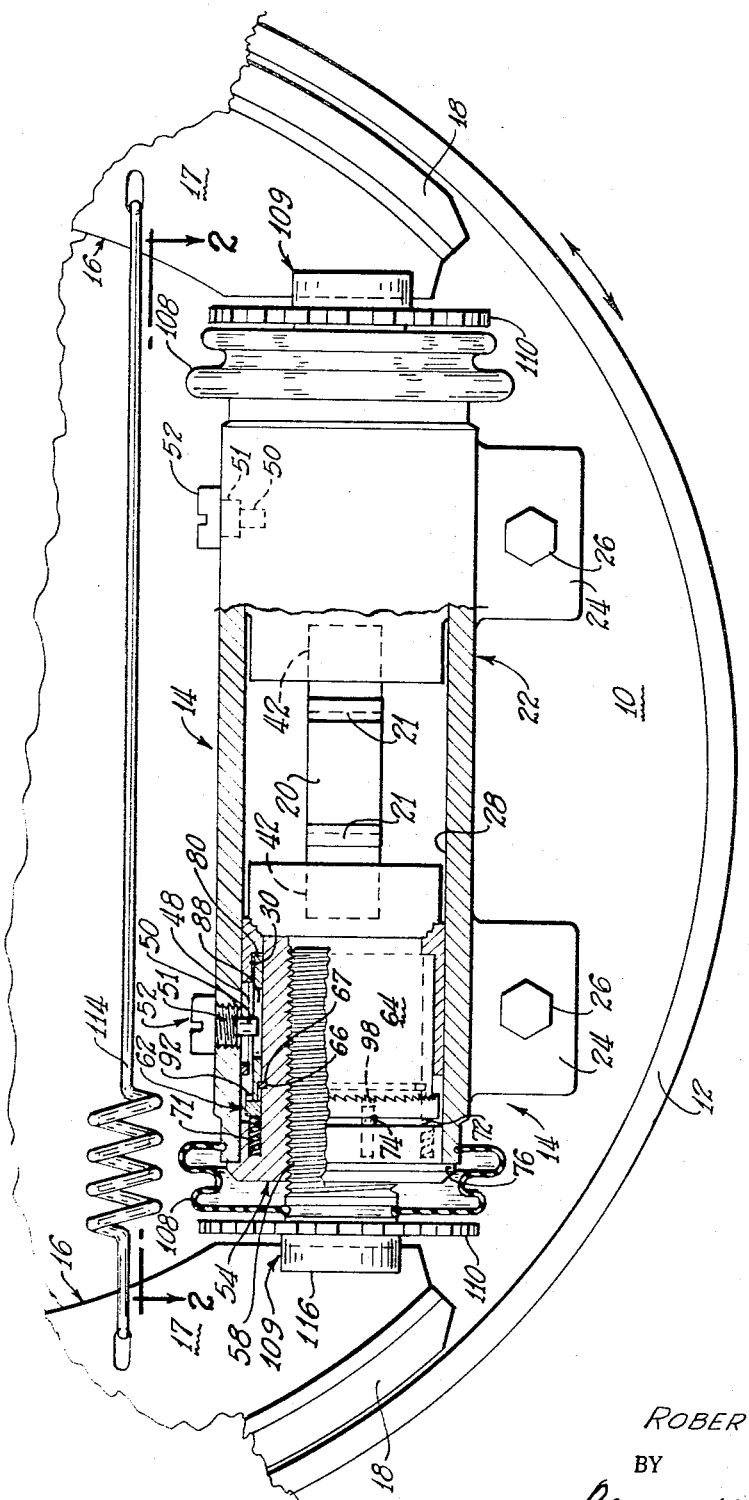
FIGURE 1 is a fragmentary, side elevational view, partly in section, of a wedge-type brake with a preferred form of the present invention incorporated therein.

It is to be understood that the invention is not limited in its application to the details of construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Environment for the invention

As shown in FIGURE 1, the environmental surroundings for the present invention comprise a vehicular axle, wheel hub, and the braking mechanism associated therewith. The wheel hub typifies that of a heavy-duty road vehicle, such as a truck. Associated with the wheel hub is a brake backing plate 10, that is non-rotatably carried at the end of an axle, not shown. A brake drum 12 is supported on the end of the rotatable hub, not shown, and is oriented to extend transversely of the plane of the backing plate 10.

The automatic adjustment mechanism of the present invention is designated by the numeral 14, and is fastened, as by bolting, to the brake backing plate 10. This mechanism 14 is oriented to cooperate with brake shoes 16 in a manner to advance the linings 18, carried thereby, into frictional contact with the inner periphery of the rotatable drum 12 and stop the vehicle. The automatic mechanism 14 also cooperates with a wedge actuator 20 that is adapted to be moved, in this instance, axially of drum 12 by means of a fluid motor and linkage mechanism, not shown, to actuate the braking mechanism.

The invention

The automatic adjustment mechanism 14 of the present invention is assembled to operate within an elongated tubular housing 22. This is suitably of cast iron, aluminum or the like, and as shown in FIGURE 1, includes a plate-like flange 24. Bolts 26 are passed through holes provided in flange 24 and in backing plate 10, whereby the mechanism 14 is secured in fixed position in space.

The ends of the mechanism 14 are symmetrical and therefore only one end will be described in detail in the following specification. It will be understood, however, that within the extended scope of the invention, one or two "ends" can be used to form an adjustment mechanism. The double end mechanism shown is effective to actuate one end of each of the brake shoes 16.

The other end of each brake shoe may or may not be anchored to a fixed pivot, not shown. However, a similar automatic adjustment and actuator mechanism can be used at the other ends of the brake shoes as will be apparent to those skilled in the art.

Referring now to the left hand half of FIGURES 1 and 2, and FIGURE 4 in entirety, it will be noted that the tubular housing 22 has a smooth cylindrical bore 28. A wedge piston cup 30 is adapted to reciprocate in sliding contact within the bore 28. The wedge piston cup 30 includes an annular side wall 32 that is slightly smaller in diameter than the diameter of bore 28 to provide a precision sliding fit.

The wedge piston cup 30 also includes a wedge-shaped end wall 34. The inside surface 36 of end wall 34 is truly diametrically oriented, and is provided with a counterbore 37. The outside surface, however, is defined by an inclined planar surface 38, embraced between two semi-circular lands 40, as shown in FIGURE 5.

A roller 42, FIGURES 1 and 2, operates along the inclined planar surface 38, and is embraced between such surface 38 and an inclined face 44 of the wedge actuator 20. The rollers 42 are kept in appropriate relationship between the faces 38 and 44 by means of abutments 39 and 21. These are exemplary and a known roller carrier can also be used at this point.

It will be understood that movement of the wedge actuator 20 in the arrow direction 46 will be effective to move the wedge piston cup 30 axially within the bore 28 of housing 22.

The side wall 32 of wedge piston cup 30, as shown in FIGURE 4, is provided with an axially oriented and elongated slot 48. This embraces a pin end 50 of a cam screw 52 that is run into a threaded hole 51, formed in an appropriate position in the side wall of housing 22. Thus, the wedge piston cup is restrained against rotation and is always oriented for non-rotatable but axial movement within the cylindrical bore 28 so that the cooperating relationship between the inclined planar surface 38, the inclined face 44, and roller 42 is always maintained.

The threaded adjuster sleeve

This is a tubular element within which a shoe actuating screw is threadably carried, and around which a ratcheting mechanism operates, to provide automatic compensation for brake lining wear.

The adjuster sleeve 54 is shown in FIGURE 4. The general configuration of this unit is that of a tube with a threaded, axial bore 56. This bore 56 receives a shoe actuating screw 58 that will be described in detail hereinafter.

The external profile of adjuster sleeve 54 comprises a smooth cylindrical portion 60 upon which a ratchet ring 62 is slidably mounted, and upon which an oscillatory ratchet sleeve 64 is rotatably mounted. It will be noted that a narrow groove 66 is formed in the surface 60 to receive a snap ring 67 which serves as an abutment for ratchet sleeve 64 and to hold ratchet ring 62 in position during assembly.

At the left end of the cylindrical surface 60, there is a shoulder 68 where the diameter enlarges to a land 70. The material of land 70 is utilized to form holes 71 and 96 to accommodate actuating springs 72 and a pin connector 74, respectively. At the extreme left end, adjuster sleeve 54 is shouldered at 76 to an enlarged annular head 78. The shoulder 76 provides an abutment by which retraction of the unit in the bore 28 of housing 22 is limited. The abutting relationship of shoulder 76 with the end of housing 22 can be observed in FIGURES 1 and 2, where all parts are shown in a retracted condition.

It will be noted that adjuster sleeve 54 bottoms in the counterbore 37 of wedge piston cup 30.

The ratchet sleeve and ratchet ring

The ratchet sleeve 64 is a tubular member having an annular side wall 80, with an inside diameter to rotatably embrace the cylindrical end 60 of adjuster sleeve 54. The right hand end of ratchet sleeve 64 is smooth in order to provide a freely rotatable relationship relative to the shoulder formed by cylindrical counter bore 37 in bottom of bore 84 of wedge piston cup 30. This provides bearing support at each end for ratchet sleeve 64, which is absolutely necessary, because ratchet sleeve 64 must rotate freely on adjuster 54 without contacting the inner wall of piston cup 30.

The ratchet sleeve 64 is free to rotate on adjuster sleeve 54 between the limits established by snap ring 67 and the shoulder of counter bore 37.

The left hand end of ratchet sleeve 64 is provided all around the periphery with a plurality of sequentially disposed and unidirectionally oriented ratchet teeth 86.

Between the ends of the annular side wall 80, there is provided a cam slot 88 that is oriented about 45° to the axis of the ratchet sleeve 64. This cam slot 88 also embraces the pin end 50 of the cam screw 52. Axial movement of the ratchet sleeve 64 will cause it to rotate by the pin end 50, cam slot 88 relationship.

The ratchet ring 62 is an annular member having a side wall 90 with ratchet teeth 92 at the right hand end which are mirror images of the teeth 86 of ratchet sleeve 64. The side wall 90 also has an inside diameter to slidably embrace cylindrical end 60 of adjuster sleeve 54.

The left hand end of the annular wall 90 is formed as a diametrically oriented flat surface 94 which functions as an abutting face for the actuator springs 72.

It will be noted that wall 90 of ratchet ring 62 is of slightly greater thickness than the annular side wall 80 of ratchet sleeve 64 to provide the abutment face 94 of proper functional width to cooperate with the actuator springs 72.

The pin connector 74 has the right end exposed. Side wall 90 of ratchet ring 62 is provided with a straight through hole 98 to receive the exposed right end of the pin 74. This provides a non-rotatable, but sliding connection between the adjuster sleeve 54 and the ratchet ring 62.

From FIGURES 1 and 2, it will be noted that the compression springs 72 are effective to bias the ratchet ring 62 into constant contact with the ratchet sleeve 64 to maintain the teeth 86 and 92 in constant mesh. Yet, the resiliency of springs 72 permits the teeth 86 to ratchet relative to the teeth 92, when called for, by appropriate rotation of the ratchet sleeve 64.

Brief review

To this point of the description, an orientation has been provided for the automatic brake adjusting mechanism 14 in its environment, to wit, a wheel hub of a heavy duty road vehicle. Additionally, most of the operating components have been shown, and their functional relationship within a bore 28 of housing 22 has been set forth.

There now remains to be discussed an operable connection between the brake shoes 16 and the functional components of the mechanism, bringing into sharp focus the manner in which a compensating factor or adjustable relationship is established to allow for brake lining wear during the operation of the vehicle.

Therefore, the immediately following description will describe in detail the shoe actuating screw as an adjustable link between the brake of the vehicle and the ratchet adjusting components just described.

The brake shoe actuating screw

The brake shoe actuating screw is designated by the reference numeral 58. This screw 58 is basically a solid cylindrical member with the body portion 100 being provided with an external screw thread 102. The thread 102 is an operable mate with threaded bore 56 of adjuster sleeve 54. At this point, it is to be understood that adjustment of the screw 58 relative to the wedge actuator 20 through the cooperating parts 30, 64, 62 and 54 provides the medium through which compensation is made for brake lining wear. Thus, the range of movement within which the wedge actuator 20 and the wedge piston cup 30 operates, is always maintained constant. Thus, the number of variables in an overall braking system incorporating the automatic mechanism of the present invention is greatly reduced. This facilitates engineering design and manufacture, and thus results in the production of consistently higher quality products.

At the left end of the threaded body portion 100 of shoe actuating screw 58, there is provided a land 104. A peripheral groove 106 extends around land 104 and is adapted to receive one end of a protective rubber boot 108.

Beyond the left side of land 106, there extends radially outwardly an enlarged annular disc head 110.

The disc head 110 is provided about its periphery with manual adjustment teeth 111. Teeth 111 are adapted to receive an appropriate wrench for manual adjustment of the unit, as when brakes are being relined, initially manufactured, or other than in-service, automatic adjustment, as provided by the invention.

At the left hand end of actuating screw 58, there is provided a coaxial stop bore 113. Into bore 113, there is fitted a brake shoe-engaging plug 109.

The brake shoe-engaging plug 109 has a head 116 with a diametrically extending slot 112, FIGURE 3. The slot 112 embraces the web 17 of a brake shoe 16 and thus is held against rotation, because of the non-rotatable nature of the web 17.

The right hand end of the brake shoe-engaging plug 109 is provided with a plurality of expanded resilient fingers 118.

These resilient fingers 118 provide frictional resistance against relative rotation between the actuating screw 58 and the brake shoe-engaging plug 109. The frictional resistance permits manual adjustment by forced turning of the toothed head 110.

From the foregoing, it will be understood that the body portion 100 of the shoe actuating screw 58 is embraced by the threaded bore 56 of the adjuster sleeve 54. It will be further understood that upon rotational movement of the adjuster sleeve 54 relative to the shoe actuating screw 58, these parts will be displaced axially relative to one another. During actual operation of the invention, the displacement is incremental, and on the order of thousandths of an inch. This moves the adjusting screw 58 to the left, thus taking up or compensating for wear of the brake lining 18.

Brief summary prior to discussion of the operation

The housing 22 provides a support member within which a reciprocable assembly of parts operates, and wherein the parts are movably operable relative to one another. Thus, the adjusting screw 58 is axially and incrementally adjustable, by means of an automatic ratchet mechanism, relative to the adjuster sleeve 54, that is in turn caused to move in a brake applying direction by means of the wedge piston cup 30.

A retraction spring 114 is effective to return the brake shoe 16 and lining 18 carried thereby, out of frictional contact with the brake drum 12. This takes place upon release of brake application force, imparted by the fluid motor and linkage mechanism alluded to above.

Operation

When the wedge actuator 20 is moved downwardly in the arrow direction 46, FIGURE 2, the rollers 42 are forced to walk up the inclined planar surface 38 of the wedge piston cup 30. This moves the wedge piston cup 30 to the left to force the brake lining 18 into frictional engagement with the shoe 12. During this leftward movement, the ratchet sleeve 64 is also forced to the left, being carried along by the wedge piston cup 30. The slidable connection between the pin end 50 of the cam screw 52 and the cam slot 88 of the ratchet sleeve 64 causes the ratchet sleeve to rotate relative to the ratchet ring 62. As mentioned above, there is a pin connection between adjuster sleeve 54 and ratchet ring 62. Because of the axial load between the thread 102 and the bore 56, the adjuster sleeve 54 does not rotate, during the outward movement of the mechanism. Thus ratchet ring 62 remains stationary. If at this point there has been a sufficient amount of brake lining wear, the teeth 86 will ratchet on the teeth 92. If not, there will be no ratcheting action.

When the brakes are released, by upward movement of wedge actuator 20, in the arrow direction 46, pressure or frictional grip between the thread 102 and the threaded bore 56 is relieved. Also shoulder 76 is "free." The retraction spring 114 moves the adjuster sleeve 54 back to the right, causing the shoulder 76 to abut on the end of the housing 22. Before this happens, however, the pin end 50, slot 88 connection causes the ratchet sleeve 64 to rotate and if there has been ratchet action between teeth 86 and 92, the ratchet ring 62 and the adjuster sleeve 54 will be turned very slightly. This will cause the shoe actuating screw 58 to be displaced perhaps a half thousandth of an inch to the left, out of the threaded bore 56. Brake lining wear is thus compensated for in this instant of retracting movement when the brakes are released.

It is to be understood that the automatic compensation does not take place on every outward stroke of brake application. It only takes place when the axial movement of the wedge piston cup is sufficient because of brake lining wear, to cause ratcheting of the teeth 86, 92 relative to one another.

Compensation for brake drum expansion by heating

It is to be understood that the pitch of threads 102 and 56, the size of teeth 86, 92 and the helix angle of slot 88 shall be geometrically established in such a manner that the shoe displacement in drum engaging application is such that overcompensation with subsequent brake drag is prevented. Thus, there is no over adjustment when the brake drum expands radially when it becomes hot from extensive brake use. Subsequent contraction after cooling would otherwise result in over adjustment.

Advantages of the present invention

From the foregoing, it will be evident to those skilled in the art that a simplified and improved mechanism has been provided. Thus all parts are sealed in a compact structure, against loss of lubricant and entry of foreign particulate materials of a damaging nature such as road dust and rain water from the environmental surroundings. It will further be evident to those skilled in the art that manufacture is simplified by the use of cylindrical and wedge contours, readily producible on production machinery including lathes, grinders and the like.

It will be further evident to those skilled in the art that there are no cocking forces encountered; thus, the ratchet teeth are balanced against one another in a complete circle. Of course, in the logical extension of the invention, a friction clutch-type ratchet mechanism could be disposed in the environment of the ratchet teeth 86 and 92. This would also function as an annular ratchet mechanism, actuatable upon operation of the wedge piston cup in a direction to apply braking force.

It will also be evident to those skilled in the art that the unit of invention is easy to service. Thus, when a brake drum is pulled, the screws 52 are exposed and can be readily removed for application of a few drops of lubricant if necessary during the life of the unit.

What is claimed is:

1. In a force applying mechanism,
a housing having a bore,
a non-rotatable cup member reciprocable within said bore,
means for applying reciprocable force against said cup member to produce axial movement of said cup within said bore,
sleeve means carried within said cup member and rotatable relative thereto,
actuator member means carried within said sleeve means,
means restraining said actuator member means against rotation,
said actuator member means and said sleeve means being relatively axially displaceable upon rotation relative to one another,
and means between said cup member and said rotatable sleeve means, rotatable upon axial movement of said cup member about the axis along which said cup member moves, to effect relative rotary movement between said sleeve means and said actuator member means and thereby effect axial displacement of said actuator member means and said sleeve means relative to one another.

2. In an automatic brake adjusting mechanism,
a housing,
an elongated bore in said housing,
a non-rotatable cup reciprocable within said bore,
means for applying axial forces to said cup to produce reciprocable movement within said bore,
an adjuster sleeve carried within said cup and rotatable relative thereto, a threaded bore oriented axially within said adjuster sleeve, a brake shoe actuator screw carried within said adjuster sleeve and movable axially of said sleeve upon relative rotation between said sleeve and said actuator screw, means restraining said brake shoe actuator screw against rotation, and ratchet means between said cup and said adjuster sleeve, rotatable upon axial movement of said cup about the axis along which said cup member moves, to effect relative rotation between said adjuster sleeve and said actuator screw to incrementally displace said screw out of said threaded bore, thereby compensating for brake lining wear.

3. In an automatic brake-adjusting mechanism for use with a friction brake, including a brake shoe carrying a brake lining, cooperable with a brake drum, an elongated tubular housing, an elongated cylindrical bore disposed coaxially within said tubular housing, a pin abutment within said cylindrical bore, a wedge cup reciprocably carried within said bore of said tubular housing, said wedge cup having a tubular wall, slidable within said bore, and a radially-extending wall, said radially-extending wall having an exposed wedge surface, means for applying force against said wedge surface to produce movement of said wedge cup within said bore of said tubular housing, an axially disposed slot in said tubular wall of said wedge cup, cooperable with said pin abutment and effective to restrain said wedge cup against rotation while permitting axial movement thereof, a tubular adjuster sleeve positioned partially within said wedge cup, said adjuster sleeve being rotatable relative to said wedge cup, said adjuster sleeve including a threaded bore to receive a brake shoe actuating screw, a brake shoe actuating screw carried partially within said threaded bore of said adjuster sleeve and axially displaceable relative to said adjuster sleeve upon relative rotation between said adjuster sleeve and said actuator screw, said screw engaging said brake shoe and thereby being held against rotation, a ratchet ring carried on said adjuster sleeve, tially within said wedge cup, a slot in said ratchet sleeve cooperable with said pin abutment and being effective to rotate said ratchet sleeve upon axial movement thereof with said wedge cup, a ratchet ring carried on said adjuster sleeve, said ratchet ring having teeth cooperable with said teeth of said ratchet sleeve, means preventing relative rotation between said ratchet ring and said adjuster sleeve, and means biasing said ratchet ring teeth and said ratchet sleeve teeth into contacting relation with one another, whereby rotation of said adjuster sleeve upon axial movement of said wedge cup is effective to ratchet said teeth of said adjuster sleeve relative to said teeth of said ratchet ring, and then rotate said adjuster sleeve relative to said actuator screw to displace said screw out of said threaded bore and compensate for broke lining wear.

4. In an automatic brake adjustment mechanism, for use with a friction brake including a brake shoe carrying a brake lining, cooperable with a brake drum, a support housing, a bore in said housing, a cup member reciprocable within said bore, means for applying axial force against said cup member to produce reciprocable movement within said bore, an adjuster sleeve carried within said cup member and rotatable relative thereto, a threaded bore within said adjuster sleeve, a brake shoe actuator screw partially carried within said adjuster sleeve and movable axially of said sleeve upon rotation of said adjuster sleeve relative to said screw, said screw engaging the brake shoe and being held against rotation, a ratchet sleeve carried on said adjuster sleeve and within said cup member, means effective to produce rotation of said ratchet sleeve upon axial movement thereof, ratchet means on said ratchet sleeve, a ratchet ring carried on said adjuster sleeve, ratchet means on said ratchet ring cooperable with said ratchet means of said ratchet sleeve, means preventing relative rotation between said ratchet ring and said adjuster sleeve, and means biasing said ratchet ring into engaged relation with said ratchet sleeve.

5. An automatic brake adjusting mechanism:

(a) at least one non-rotatable piston cup slidably mounted for movement along a longitudinal axis to activate a braking mechanism;

(b) an actuating screw mounted for unitary movement with said piston cup, and axial movement relative thereto;

(c) an adjusting sleeve rotatable relative to the actuating screw for moving the actuating screw axially relative to the piston cup;

(d) a rotatable sleeve surrounding at least a portion of said adjusting sleeve and mounted for unitary axial movement with said piston cup, said rotatable sleeve as it axially moves with said piston cup in one direction, rotatable, about the axis along which said piston cup moves, from a fixed circumferential position relative to said piston cup, to predetermined circumferential positions relative to the axial movement of said piston cup, and said rotatable sleeve as it axially moves with said piston cup in an opposite direction rotatable about said axis back to its said fixed circumferential position; and (e) means coacting between said rotatable sleeve and said adjusting sleeve upon predetermined axial movement of said piston cup in said one direction for engaging and holding said rotatable sleeve in a circumferential position relative to said adjusting sleeve such that when said rotatable sleeve moves in said opposite direction with said piston cup, the adjusting sleeve and rotatable sleeve rotate in unison back to the said fixed circumferential position of said rotatable sleeve, said adjusting sleeve as it rotates moving said actuating screw axially relative to said piston cup in order to adjust axial movement of said piston cup.

6. The mechanism of claim 5, wherein said actuating screw includes a screw for engaging a brake shoe, and means are provided for frictionally mounting said screw on said actuating screw.

7. The mechanism of claim 6, which includes means for manually rotating said actuating screw relative to said adjusting sleeve to manually adjust axial movement of said piston cup.

8. The mechanism of claim 5, wherein the engaging and holding means (e) includes:

(f) a ratchet ring coupled for unitary axial and rotational movement with said adjusting screw; and (g) ratchet teeth for mating meshing engagement disposed in confronting surfaces of said ratchet ring and rotatable sleeve.

9. The mechanism of claim 8 which includes:
(h) means for biasing the ratchet ring against said rotatable sleeve to hold the ratchet teeth (g) in meshing engagement.

10. The mechanism of claim 9, which includes:
(i) means for mounting the piston cup for non-rotatable axial movement;
(j) means for mounting the rotatable sleeve for unitary axial movement with the piston cup; and
(k) means for mounting the rotatable sleeve for rotary movement in response to its axial movement with said piston cup.

11. The mechanism of claim 10, wherein the means (i) includes a pin fixedly mounted relative to the piston cup, and a longitudinally disposed slot in the piston cup for receiving said pin.

12. The mechanism of claim 11, wherein the means (k) includes an angularly disposed slot in the rotatable sleeve for receiving said fixedly mounted pin.

13. The mechanism of claim 12, which includes:
(e) means for moving said piston cup along said longitudinal axis.

References Cited

UNITED STATES PATENTS

| | | | |
|---|---|---|---|
| 2,184,683 | 12/1939 | Shuman | 188—79.5 |
| 3,068,964 | 12/1962 | Williams et al. | 188—79.5 |
| 3,232,392 | 2/1966 | Mossey | 188—196 |

DUANE A. REGER, *Primary Examiner.*